July 2, 1968    N. SHEPTAK    3,390,425
NECK RING FOR BLOW-MOLD
Filed Sept. 7, 1965    2 Sheets-Sheet 1

INVENTOR
NICHOLAS SHEPTAK

BY  Plumley, Tyner & Sandt

ATTORNEYS

July 2, 1968   N. SHEPTAK   3,390,425
NECK RING FOR BLOW-MOLD
Filed Sept. 7, 1965   2 Sheets-Sheet 2

INVENTOR
NICHOLAS SHEPTAK
BY Plumley, Tyner & Sandt
ATTORNEYS

United States Patent Office 3,390,425
Patented July 2, 1968

3,390,425
NECK RING FOR BLOW-MOLD
Nicholas Sheptak, Midland, Mich., assignor to The Dow Chemical Company, Midland, Mich., a corporation of Delaware
Filed Sept. 7, 1965, Ser. No. 485,302
4 Claims. (Cl. 18—5)

ABSTRACT OF THE DISCLOSURE

A blow-molding device for thickening the neck section of a bottle, which comprises two mold halves which join along a parting line to define an interior mold cavity and a flow-restricting dam which opposes the flow of molten material away from the neck section and which is positioned adjacent to and immediately outside the area of contact between the two mold halves transversely to the normal flow of molten material away from the neck portion.

---

This invention relates to a neck ring for a blow-mold for making bottles from plastic material; and, more particularly, it relates to a neck ring for a blow-mold used in the manufacture of large diameter thin wall bottles.

It is well known that synthetic thermoplastic resins are frequently used in the manufacture of bottles of various sizes and shapes. The most common technique for preparing bottles from synthetic thermoplastic resins is the "blow-molding" method in which a tubular portion (called a "parison") of a softened resinous material is extruded into the mold cavity between two halves of a mold shaped to conform to the outside contour of the bottle. The mold is closed causing one end of the tubular parison to be pinched shut while inserting in the other end a tube (called a "blow-pin") for blowing compressed air into the parison and thereby expanding it against the mold cavity to form the bottle. This method is relatively simple when the bottle is small and somewhat regular in shape; but when special, irregular features are incorporated into the design of the bottle, modifications must be made in the technique of blow-molding in order to manufacture the bottle. Bottles which are much larger in volume than about one quart frequently are prepared with a handle to provide the user a convenience in handling the bottle. Furthermore, many bottles which are as large as 2–4 quarts in size have a mouth which is not substantially larger than that of a bottle having a much smaller volume. Under these conditions, the molder has a problem of selecting a parison of the appropriate size to be blow-molded with the proper wall thicknesses specified for the various portions of the bottle. For example, the walls in the main body of the bottle are normally much thinner than the portions around the handle and the neck, since the latter two receive considerably more stress in use and, accordingly, require greater strength than other portions of the bottle.

A further problem develops if the bottle is to have an integrally molded handle. In this case, the molder normally employs a parison which, when it is collapsed and flattened, has a width at least as great as the diameter of the bottle. This is necessary in order to supply enough of the molding material to extend beyond the mold cores which form the handle of the bottle. With this limitation facing him, the molder employs a thin wall parsion, which, in turn, raises the problem of thickening the wall in the neck portion of the bottle to make it strong enough to withstand the stresses of use. If the bottle is designed to be closed by a threaded cap, the neck portion of the bottle must be relatively thick to withstand the forces applied in screwing a cap onto and off the bottle the many times this will be necessary during the life of the container.

It is an object of this invention to provide an improved blow-mold for the preparation of large thin wall bottles. It is another object of this invention to provide an improved blow-mold for preparing large diameter bottles having integrally molded handles and having relatively thick walls in the neck portions. It is another object of this invention to provide an improved blow-mold with means for accumulating molten plastic in the neck portions of the bottle during the blow-molding operation. Other objects will appear from the more detailed description of this invention which follows.

The foregoing objects are accomplished in accordance with this invention by providing a device for thickening the wall in the neck section of a bottle being formed from a parison of thermoplastic molding material in a blow-mold comprising two mold halves which join along a parting line to produce an interior mold cavity conforming to the outside configuration of the desired bottle, and a flow restriction opposing the flow of molten thermoplastic molding material away from the neck section of the blow-mold as the mold closes on the parison, said flow restriction being positioned adjacent to and immediately outside the area of contact between said two mold halves along the parting line and transverse to the normal flow of molten material away from the neck portion when the two mold halves are closed on each other. In the preferred mode of embodiment, the flow restriction comprises a pair of flat plates spaced apart and facing each other on each side of the neck portion of the mold, the upper surfaces of said plates being spaced apart not more than about 0.01 inch when the mold halves are closed.

The invention may be understood more completely by reference to the attached drawings.

Figures 1, 2, 3:
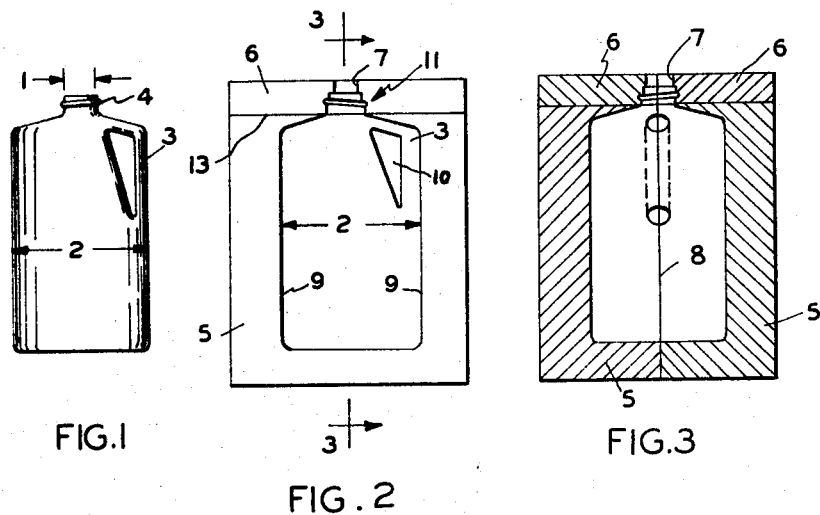
FIGURE 1 illustrates one type of bottle which might be made by the blow-mold of this invention.
FIGURE 2 is a view of the interior of one-half of the blow-mold of this invention.
FIGURE 3 is a cross-sectional view of the closed blow-mold taken in the direction of line 3—3 of FIGURE 2.

In FIGURE 1, there is shown one type of bottle which is beneficially made by the blow-mold of this invention. The bottle is one having a relatively large volume, e.g., one quart or more, and having a relatively small diameter neck portion 1 as compared to a large diameter body portion 2. For example, the diameter of the neck portion 1 may be not substantially larger than about 2-inches while the diameter of the body portion 2 may be 5–10 inches or more in size. If the bottle is large enough in volume, or has a substantially large body diameter 2, a handle 3 may be required to provide the consumer with a convenient means for emptying the contents of the bottle. The particular type of closure means on the neck portion of the bottle does not represent any part of this invention and may take any of several forms. In FIGURE 1 the closure means is a screw thread 4 which mates with a screw cap (not shown) to effect a tight closure of the bottle.

The bottle just described with reference to FIGURE 1, will generally have a thin wall in the body portion and a substantially thicker wall in the neck portion and the handle. The walls of the main body of the bottle need only be strong enough not to break during the normal usage of the bottle. On the other hand, the neck portion of the bottle is subjected to a twisting action each time the screw cap is removed from or reattached to the bottle. For this reason, the wall thickness in the neck portion of the bottle must be somewhat heavier to withstand the repeated torque stresses alternately applied in different directions. For similar reasons, the handle portion also requires heavier walls than the main body portion of the bottle.

In FIGURES 2 and 3, there are two schematic views of the blow-mold which might be employed to make the bottle of FIGURE 1. FIGURE 2 shows the inside of one-half of the blow-mold having a mold cavity 9 conforming exactly to one-half of the outside contour of the bottle of FIGURE 1. The mold itself is made up of a body section 5 and a neck ring 6. Neck ring 6 contains passageway 7 into which a blow-pin is inserted to conduct compressed air to the inside of the parison. The blow-mold is made of two halves which are mirror images of each other and which form when closed upon each other a mold cavity exactly conforming to the outer shape of the bottle being molded.

In FIGURE 3, there is an illustration of a section taken through two closed mold halves at a right angle to the view shown in FIGURE 2. Thus, in FIGURE 3 there are two body sections 5 and two neck ring sections 6 which meet along parting line 8 to form the complete mold. Passageway 7 is formed by the two neck ring portions 6.

The blow-molding of a bottle in a mold having the general proportions and characteristics shown in FIGURES 2 and 3 presents the molder with the difficult problem of preparing a bottle with a thin wall in the body portion and substantially thicker walls in the neck portion and the handle portion of the bottle. In order to form the integrally molded handle, the parison must be sufficiently large in diameter that when the two mold halves 5 close on each other causing the parison to flatten, it will extend far enough beyond core 10 to permit handle 3 to be formed. A parison that large in diameter will not be stretched very much in the blowing step and therefore must have a relatively thin wall from the beginning. The molder, therefore, must find a means to cause the thin walls of the parison to be thickened during the molding operation around the neck and the handle of the bottle.

There is no particular problem in thickening the walls in the handle portion, since the molten material in the parison is caught between the two closing mold halves in the area of handle 3, and is expanded only very slightly, if at all, by the blowing action. The portion in area 10 is later trimmed out to provide the handle opening.

Figure 4:
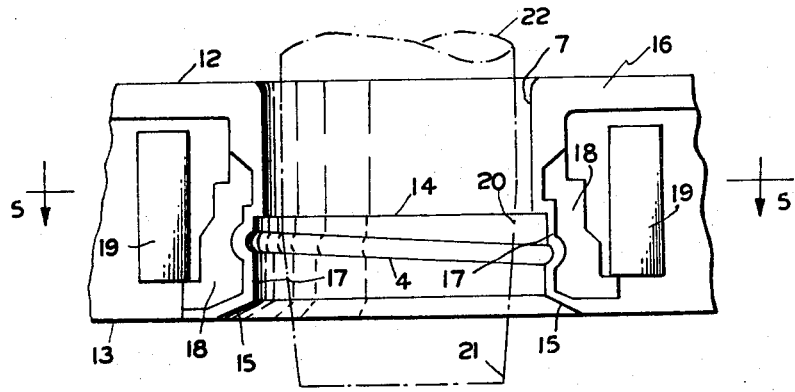
FIGURE 4 is an enlarged view of the neck portion of the blow-mold shown in FIGURE 2.
Figure 5:
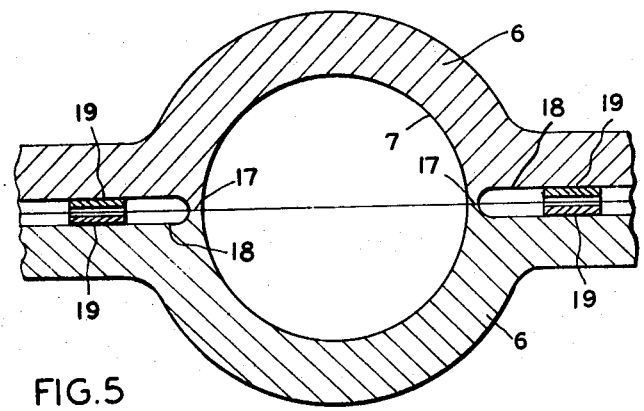
FIGURE 5 is a cross-sectional view of the neck portion of the closed blow-mold taken along line 5—5 of FIGURE 4.

The problem of supplying sufficient material to thicken the walls in the neck portion of the bottle is not so easily solved, however. FIGURES 4 and 5, which are enlarged views of the neck portions of the mold, illustrate how this invention solves the problem. FIGURE 4 is an enlarged view of the neck ring portion indicated generally at 11 in FIGURE 2. The neck ring has an outer surface 12 and an inner surface 13 the latter of which is tightly fastened by bolts or other suitable means to body portion 5 of the mold. The mold cavity in FIGURE 4 extends from the upper extremity 14 of the neck to the shoulders 15, and thence in body portion 5 around the remainder of mold cavity 9. Screw thread 4 is the means illustrated here for attaching a closure to the bottle. Passageway 7 is slightly smaller in diameter than the outside diameter of the bottle neck being molded. Passageway 7 is employed to permit the introduction of blow pin 22 into the open end of the parison for blowing the molten material outward against the mold cavity to form the bottle. Parting line surface 16 is precisely machined so as to mate with its counterpart surface on the other mold half and form a seal when the two mold halves are closed on each other. Parting line surfaces 16 when viewed in the direction illustrated in FIGURE 3, form parting line 8. In the immediate vicinity of the mold cavity, parting line surfaces 16 narrow to the smaller area shown at 17, which is essentially a line contact designed to function as a seal where the molten parison is pinched off. Since surfaces 17 do not actually prevent the flow of molding material away from the neck portion, other means are required to cause the walls to thicken in this part of the bottle.

In area 18 there is no contact between the two mold halves, and this area has been found to be a suitable location for the improvement of this invention. As close as possible to parting line surface 17 are placed two dams 19 in each mold half, positioned to be transverse to the normal flow of molten material away from that surface. When the two mold halves are closed on each other the parison is pinched in the area of surface 17 causing the molten material in the pinched portions to flow to the left and to the right into the less constricted spaces represented area 18. Dams 19 are placed with their long axes at right angles to those normal flow lines and as close as possible to parting line surface 17 to build up a substantial restriction to the flow of molten material in that direction and an actual reversal of flow direction so that the molten material will remain in the neck portion of the bottle being molded.

The molten material is not free to flow inward because of the presence of blow-pin 22. It is a preferred mode of operation, however, for blow-pin 22 to assist in building up the wall thickness of the neck portion of the bottle. In order to provide this assistance, blow-pin 22 functions as a sizing mandrel by fitting snugly into the inside surface of the bottle at its outer extremity. Beyond this point the blow-pin tapers inwardly to facilitate its removal from the bottle after it is molded. With reference to FIGURE 4, this means that at the upper extermity 14 of the bottle, blow-pin 22 is substantially the same size as the inside of the bottle opening. Therefore, blow-pin 22 is substantially cylindrical down to the vicinity of 20 and thereafter tapers inwardly to a smaller diameter at its lower extremity 21.

In FIGURE 5, the placement of dams 19 may be seen. Passageway 7 is formed in neck ring 6 by the two mold halves joining along parting line 8. Close to the mold cavity, parting line surface 17 narrows where the two mold halves meet to pinch off the parison. Immediately beyond the parting line surface 17 the two mold halves diverge from each other in the area 18 and do not contact the corresponding surface of the other mold half. In these areas 18 are located the two opposed pairs of dams 19 which provide the flow restrictions opposing the flow of molten material away from the vicinity of parting line surfaces 17. The dams are positioned in opposed pairs so that as the two mold halves are closed on each other, the two upper surfaces of the dams close on each other without touching. Since the molten material of the parison is in a highly viscous state, the opposing surfaces of dams 19 provide increased frictional forces restricting the flow of fluid between those surfaces. It has been found that under normal molding conditions, if the space between the two opposing surfaces of any pair of dams 19 is not greater than about 0.01-inch when the two mold halves are closed on each other, the frictional forces are sufficiently great to prevent any substantial flow between those surfaces. This effect restricts the flow away from the area of the parting line surfaces 17 and thereby causes the material to flow back into the cavity in the neck portion. It is important for the opposing surfaces of dams 19 to have some practical, finite dimension in the direction of fluid flow, even though the actual size of this dimension is not critical and may be as small as about ⅛ inch. Sizes larger than about ½ inch are normally superfluous. The actual shape of dams 19 need not be rectangular as shown in FIGURE 4, nor flat as shown in FIGURE 5. All that is necessary is that the flow path presented to the molten material be so restricted that the material finds less restriction to its flow in the reverse direction. Thus, the shape as viewed in FIGURE 4 may be oblong, oval, rectangular, irregularly curved, or the like, and the shape as viewed in FIGURE 5 may likewise be angular, curved, or otherwise varied to produce a flow restriction.

Figure 6:
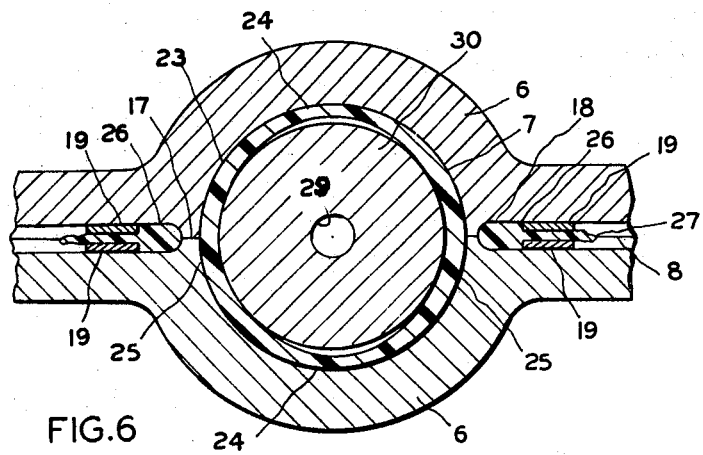
FIGURES 6 and 7 are the same cross-sectional views as in FIGURE 5 with additional illustrations of how the molding material is formed in the walls of the neck portion of the bottle.
Figure 7:
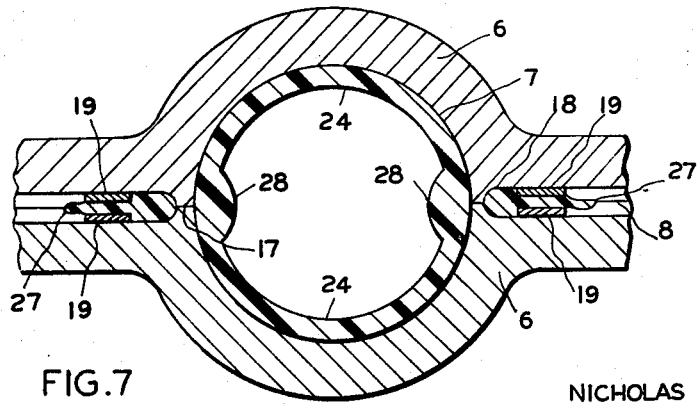

FIGURES 6 and 7 illustrate how the flow restrictions of this invention cause the neck portion of the bottle to be thickened. In FIGURE 6, the two mold halves 6 are closed on each other catching the parison 23 between them. Blow-pin 30 is in the neck ring as the mold halves are closed. Its outside surfaces function as a mandrel to provide a form for shaping the interior of the bottle neck, and a central passageway 29 admits compressed air to the mold. When the parting line surfaces 17 are almost closed on each other, the plastic molding material is squeezed in both directions away from those surfaces and fills spaces 26. The presence of dams 19, however prevents very much of the plastic from flowing in that direction and thereby causes a rapid buildup of back-pressure forcing the plastic to flow back into the neck portion of the bottle at 25. A small amount of plastic will, of course, flow over dams 19 and produce a flash 27. If the amount of plastic which flows back into the neck portion is insufficient to completely fill the space between blow-pin 24 and mold halves 6, the neck walls will be thicker at 25 and thinner at 24. If, on the other hand, there is sufficient plastic to fill the space the neck walls will be uniformly as thick as at 25.

In FIGURE 7 there is illustrated an alternative whereby there is no mandrel used to shape the interior surface of the neck. In this embodiment the plastic which flows back into the neck portion forms an internal bead 28 on the inside of the neck stiffening and strengthening the neck thereby. The other portions of the neck will have a thickness at 24 which is substantially the same as that of the parison before the mold is closed. In this embodiment the compressed air for the molding operation may be introduced through a blow-pin in the neck portion which does not shape the interior surface, or the air may be introduced into other portions of the mold than the neck portion. Alternative methods of blowing are well known to those skilled in this art.

The device of this invention is applicable in any of the usual processes for blow-molding hollow materials. The molded article need not be a bottle but may be any of various types of containers used in a wide variety of applications. The material which is employed as the molten molding material may be any thermoplastic composition generally used in blow-molding processes, such as polyolefins, polyvinyls, polyacetals, polyamides, and other synthetic thermoplastic molding materials.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A blow-mold containing a device for thickening the neck section of a bottle being formed from a parison of molten material comprising two mold halves which join along a parting line to define an interior mold cavity conforming to the outside configuration of the desired bottle, and a stationary flow restriction fixedly attached to at least one of said mold halves opposing the flow of said molten material away from the neck section as the two mold halves are closed on each other, said flow restriction being positioned adjacent to and immediately outside the area of contact between the two mold halves along the said parting line and transverse to the normal flow of molten material away from the neck portion when the two mold halves are closed on each other.

2. The device of claim 1, in which said bottle is a large diameter thin wall bottle.

3. The device of claim 1, in which said flow restriction comprises an opposed pair of flat plates on each side of the neck portion of the mold, the opposing surfaces of said pair being spaced from each other by not more than about 0.01-inch when the mold halves are closed on each other.

4. The device of claim 1 when used in conjunction with a blow-pin closely fitting the inside diameter of the neck of said bottle at the outer extremity of said neck.

References Cited
UNITED STATES PATENTS

| | | | |
|---|---|---|---|
| 3,031,718 | 5/1962 | Adams | 18—5 X |
| 3,141,196 | 7/1964 | Langecker | 18—5 X |
| 3,278,664 | 10/1966 | Langecker | 18—5 X |
| 3,295,159 | 1/1967 | Fischer | 18—5 X |

WILBUR L. McBAY, *Primary Examiner.*